July 26, 1927.
A. M. NICOLSON
1,636,830
CEMENT COMPOSITION AND METHOD OF PREPARATION
Filed Sept. 30, 1924
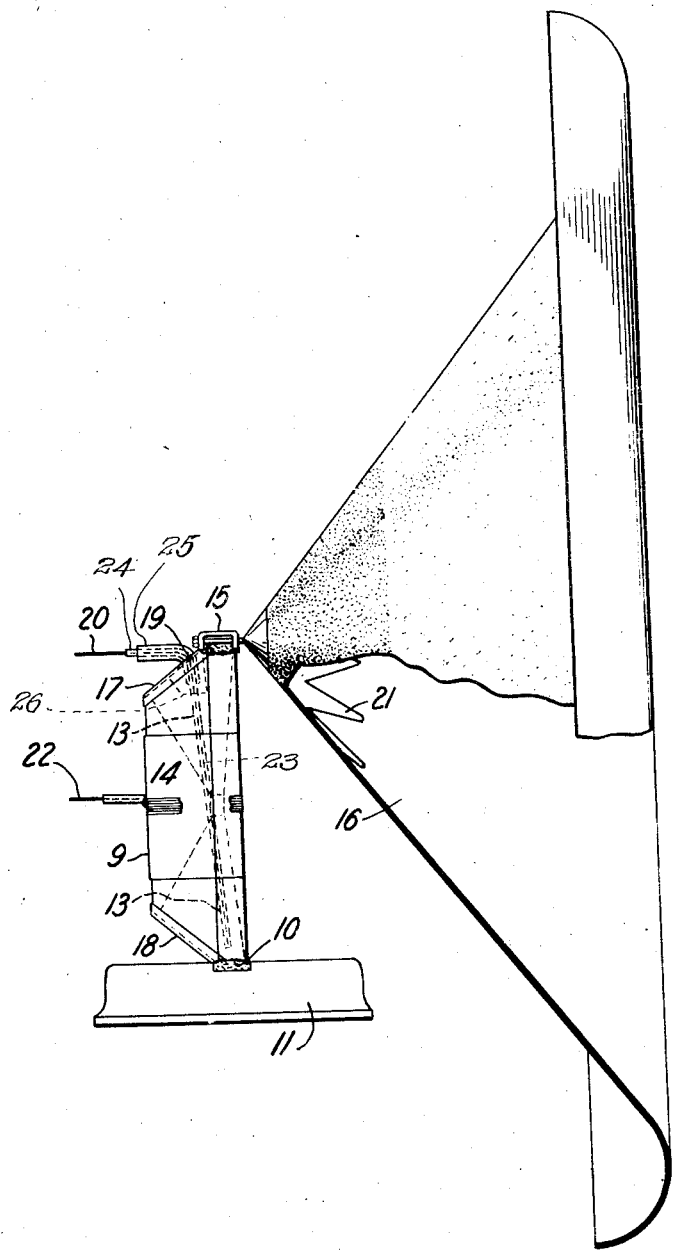
Inventor:
Alexander M. Nicolson.
by Ewadam Att'y.

Patented July 26, 1927.

1,636,830

UNITED STATES PATENT OFFICE.

ALEXANDER M. NICOLSON, OF NEW YORK, N. Y., ASSIGNOR TO WESTERN ELECTRIC COMPANY, INCORPORATED, OF NEW YORK, N. Y., A CORPORATION OF NEW YORK.

CEMENT COMPOSITION AND METHOD OF PREPARATION.

Application filed September 30, 1924. Serial No. 740,746.

This invention relates to a composition of matter and particularly to a cement composition and to a method of making the same.

An object of the invention is to produce a good adhering cement having the characteristics of an insulator.

Another object of the invention is the production of a cement composition which is particularly well adapted for use in connection with piezo-electric crystal structure of Rochelle salt.

Still another object of the invention is a method of and means for preventing the desiccation of Rochelle salt compositions.

The single figure of the drawing illustrates some of the uses of this cement in connection with a loud speaking telephone receiver. There is represented a piezo-electric crystal 9 of the type described in my article on "The Piezo-Electric Effect in the Composite Rochelle Salt Crystal", proceedings of the A. I. E. E., November, 1919, page 1315. A crystal of this nature and its method of production are disclosed in my prior Patent 1,438,965, dated December 19, 1922, Patent 1,590,311, dated June 29, 1926, and Patent 1,562,578, dated November 24, 1925, and in my copending patent application Serial No. 621,704, filed February 28, 1923. The crystal 9 is here shown connected to the diaphragm 16 of a loud speaker. Such a crystal has the property of transforming an alternating current voltage communicated to it through the oppositely charged girdle and pyramidal or internal electrodes 14 and 13 respectively, into mechanical vibrations which may be, in turn, communicated to a tone plate 15 which actuates the diaphragm 16. It has been found desirable to join the various metallic and crystalline elements with a cement composition which will cut off electrical conductivity between the internal electrode 13 and the girdle electrode 14 and further, which will produce a compound structure which is mechanically strong.

In accordance with the features of this invention there is provided a cement composition which may be advantageously used for these or similar purposes. Such a composition may be used, for example, to cover the ends of the pyramidal electrode at 17 and 18, to cement the lead 20 at the point 19 where it enters the pyramidal electrode, to cement the crystal to the base at 10, and to cement the metallic tone plate 15 to the top of the crystal. In these applications of this cement composition, advantage is taken of its especially strong adhering properties and of its electrical insulating properties.

Where the wire 23 passes through the surface of the crystal, it may have a rubber or other electrically insulating covering as indicated at 24; a tube 25 of quartz or the like having high surface leakage resistance may also surround this portion of the wire 23. The cement composition of the present invention is carefully placed around the elements 23, 24 and 25 where they pass through the crystal surface as indicated at 26.

In the operation of the structure of the drawing, an alternating current voltage is applied between the leads 20 and 22 and is transmitted through the electrodes 13 and 14 to the crystal 9, which transforms this voltage into mechanical vibrations, which are in turn communicated to the tone plate 15, which actuates the diaphragm 16 of a loud speaker and, therefore, causes the production of sound waves in the air.

In accordance with the features of this invention, there is provided a group of compositions comprising sodium potassium tartrate containing varying percentages of its water of crystallization. It has been found that compositions composed of fused, and subsequently super-cooled, sodium potassium tartrate, $NaKC_4H_4O_6.4H_2O$, possess the adhering and insulating properties necessary in a cement for use in conjunction with Rochelle salt piezo-electric appliances, for example, and when properly proportioned will not be substantially amorphous and will not set too rapidly for practical use. The strength, insulating properties and time of setting of this group of compositions make them applicable over a wide range of conditions.

The proportions of water of crystallization retained by the crystalline mass after fusion which may be employed in these cements may be considerably varied, changes in such proportions, of course, varying the strength and time of setting of the particular cement formed. It has been found that, as a general rule, the more water of crystallization retained after fusion, the longer is the period required for setting. Also, while quicker setting appears to result with less water of crystallization retained, it has further been noted that the composition becomes somewhat amorphous and loses considerable of its adhering properties with less water of crystallization retained.

In one method of preparation, sodium potassium tartrate, $NaKC_4H_4O_6.4H_2O$, is heated at a temperature between 74° C. (the melting point of the crystallized salt) and 120° C., and is then super-cooled. The time of heating or fusing will, of course, vary with the amount of sodium potassium tartrate used and with the amount of water of crystallization which it is desired to drive off. Such a composition when prepared in the above manner is adapted for use, after being super-cooled and before being allowed to solidify.

The super-cooled composition may, however, be allowed to solidify and later, at some desired time, re-melted, without allowing appreciable further evaporation, and then super-cooled, when it is again adapted for application as cement.

For ordinary applications as a cement, it is usually desirable to drive off in the fusion process approximately 20% of the water of crystallization. With small amounts of sodium potassium tartrate, 100 grams for example, the time required for the fusion step has been found to vary from one to four minutes, depending upon the temperature employed; specifically, it has been noted that such a sample will require about two minutes heating at 80° C. for the production of a good cement composition.

The time required for cement compositions, as prepared by this method, to set has been found to vary from five minutes to four hours, depending upon the amount of water which has been retained and upon the mass of cement used. It has been found, for example, that 5 grams of a composition containing approximately 80% of its water of crystallization will require only a few minutes to set, if agitated.

It is generally advisable to use sodium potassium tartrate which contains all of its water of crystallization, so that standardized conditions for heating and setting may be determined. In case, therefore, partially dehydrated crystals are employed, it has been found desirable to add sufficient water before fusing to bring the total water content up to the water of crystallization value.

The preferred conditions of heating, that is, temperature and time, will depend to a great extent, upon the use to which the particular cement is to be applied. It is, of course, always desirable to drive off sufficient water to produce a strong adhering composition and it will depend upon the restrictions placed upon the time of setting as to the amount of water driven off and, therefore, as to the time and temperature of fusion. It will be appreciated, therefore, that it is not intended to impose any restrictions upon the proportions of water retained in the cement composition employed and therefore upon the conditions of heating, other than those set forth in the claims.

The cement composition of this invention is particularly well adapted for use in connection with Rochelle salt piezo-electric crystals, as the molecular compositions of both the cement and the surface to be cemented are the same, which, therefore, insures adherence. Further, the cement is of especial advantage in that it may be used at the point 21 of the drawing, being applied as a star-shaped mass upon the inside of the conical diaphragm 16 near its apex; such a mass of cement has been found to stiffen the diaphragm and to impart to it a high mechanical impedance corresponding to the impedance possessed by the crystal.

It has been noted that the cement composition as produced above, when exposed to ordinary atmospheric conditions, shows a tendency toward a partial desiccation and, therefore, toward a decrease in its crystalline and adhesive values. It has been found that this desiccation may be reduced if the cement is maintained in an atmosphere humid at all times at a vapor pressure at least equal to that of the original hydrated sodium potassium tartrate crystals. Another feature of this invention resides, therefore, in the provision of a simple and effective preventative of the harmful drying action described above by maintaining an atmosphere humid at the vapor pressure of the original hydrated sodium potassium tartrate crystals.

One way of maintaining the condition of an atmosphere containing water vapor at a pressure at least equal to that of hydrated sodium potassium tartrate crystals around the cement, might be to varnish the exposed surfaces of the cement. Such a method has been described in my prior Patent 1,414,370, dated May 2, 1922, in connection with Rochelle salt piezo-electric appliances; trouble has been encountered in this method, however, in the provision of a suitable varnish coating which would be moisture-proof.

In accordance with this invention, the cement structure is enclosed with a quantity of efflorescent crystals such as hydrated sodium potassium tartrate, for example, within a metallic casing whose elements are substantially tight-fitting so as to allow only a limited circulation of air. Such a mass of efflorescent crystals has been found to maintain the condition of an atmosphere containing at all times an amount of water vapor which will exert a pressure at least equal to that of semi-hydrated sodium potassium tartrate. Sodium potassium tartrate is particularly well-adapted for use with the cement composition of this invention as the cement will lose appreciable water only after the mass of loose crystals has lost considerable of its water, at which time they may be replaced by fresh crystals. The mass of efflorescent crystals may be renewed from time to time as they lose their water of crystallization.

This feature may also be employed to retard the desiccation of Rochelle salt piezoelectric crystals by enclosing the crystal within a similar casing together with a quantity of efflorescent crystals.

Any other suitable material may, of course, be used in place of Rochelle salt in an enclosed space to provide an atmosphere which possesses at least some desired degree of humidity.

Although illustrated specifically by its use in connection with Rochelle salt crystals, it is evident that the cement composition of this invention may be employed in any instance where a strong adhering or insulating cement may be required, such as, for example, joining glass to glass, metal to metal, or glass to metal, and in other situations; and further that this new use of efflorescent substances may be employed in any case where it is desirable to maintain an atmosphere containing water vapor at a pressure above some given pressure.

What is claimed is:

1. A cement composition comprising fused and super-cooled sodium potassium tartrate crystals.

2. The process of preparing a cement composition which comprises heating sodium potassium tartrate crystals to at least its fusion temperature and then super-cooling said heated mass.

3. The method of preparing a cement composition which comprises heating sodium potassium tartrate to at least its melting point, super-cooling said mass, and allowing said mass to solidify.

4. The method of preparing a cement composition which comprises heating a mixture of water and sodium potassium tartrate, and super-cooling said heated mixture.

5. The process of preparing a cement composition which comprises heating sodium potassium tartrate crystals to a temperature at least as high as 74° C., and super-cooling said mass.

6. A method of preparing a cement composition which comprises heating sodium potassium tartrate to a temperature between 74° and 120° C., and then super-cooling the heated mass.

7. The process of preparing a cement composition which comprises heating sodium potassium tartrate to at least its fusing temperature for a period of time at least sufficient to drive off approximately 20% of its total weight of water crystallization and super-cooling said heated mass.

8. The process of preparing a cement composition which comprises heating sodium potassium tartrate to a temperature in the neighborhood of and at least as high as its fusing temperature for a period of time of from 1 to 4 minutes and supercooling said mass.

9. The combination with a crystalline Rochelle salt body of Rochelle salt cement applied thereto.

10. A Rochelle salt crystal having two portions of its surface oppositely electrified when said crystal is stressed, one of said portions being substantially bounded by said other surface portion, and a coating of cement substantially covering said one surface portion, said cement comprising Rochelle salt with part of its water of crystallization removed.

11. A piezo electric crystal comprising poles of opposite signs, one of said poles terminating in one end of said crystal and said other pole encircling said one pole, and a coating of Rochelle salt cement on said end of said crystal and substantially covering said termination of said one pole.

12. A Rochelle salt body and a cement thereon comprising Rochelle salt with part of its water of crystallization removed.

13. A cement composition comprising fused and supercooled sodium potassium tartrate crystals, substantially 20% of the water crystallization of said crystals having been driven off by fusing.

In witness whereof, I hereunto subscribe my name this 25th day of September, A. D. 1924.

ALEXANDER M. NICOLSON.